US009455883B1

(12) United States Patent
Crable

(10) Patent No.: US 9,455,883 B1
(45) Date of Patent: Sep. 27, 2016

(54) METHOD AND APPARATUS FOR PROVISIONING SHARED NFS STORAGE

(75) Inventor: Frederick Crable, Allen, TX (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/435,146

(22) Filed: Mar. 30, 2012

(51) Int. Cl.
G06F 15/173 (2006.01)
H04L 12/24 (2006.01)

(52) U.S. Cl.
CPC ....... H04L 41/5054 (2013.01); H04L 41/5045 (2013.01)

(58) Field of Classification Search
USPC ................................................ 709/220, 226
See application file for complete search history.

(56) References Cited

U.S. PATENT DOCUMENTS

| | | | |
|---|---|---|---|
| 7,194,538 B1 | 3/2007 | Rabe et al. | |
| 8,407,413 B1* | 3/2013 | Yucel et al. | 711/108 |
| 8,874,749 B1* | 10/2014 | Vittal | G06F 9/5077 709/226 |
| 2003/0069972 A1* | 4/2003 | Yoshimura | H04L 12/4645 709/226 |
| 2003/0081598 A1* | 5/2003 | Bresniker | H04L 49/15 370/386 |
| 2003/0208638 A1* | 11/2003 | Abrams et al. | 709/328 |
| 2006/0095435 A1* | 5/2006 | Johnson | G06F 8/71 707/10 |
| 2006/0112247 A1 | 5/2006 | Ramany et al. | |
| 2007/0133554 A1* | 6/2007 | Ederer et al. | 370/395.3 |
| 2009/0276771 A1* | 11/2009 | Nickolov et al. | 717/177 |
| 2011/0022812 A1 | 1/2011 | Van der Linden et al. | |
| 2011/0126275 A1* | 5/2011 | Anderson et al. | 726/8 |
| 2011/0252420 A1* | 10/2011 | Tung et al. | 718/1 |
| 2013/0055249 A1* | 2/2013 | Vaghani et al. | 718/1 |

OTHER PUBLICATIONS

U.S. Appl. No. 13/435,317, filed Mar. 30, 2007, Prabhakara, et al.
U.S. Appl. No. 13/629,017, filed Sep. 27, 2012, Crable, et al.
U.S. Appl. No. 13/536,705, filed Jun. 28, 2012, Beach, et al.
Vblock Infrastructure Platforms Series 300 Architecture Overview, Version 2.4, Aug. 2011, The Virtual Computing Environment Company, www.vce.com, 74 pages.
Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.
EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.
VMware vStorage APIs for Array Integration with EMC VNX Series for NAS, Benefits of EMC VNX for File Integration with VMware VAAI, White Paper, EMC Solutions Group, Jan. 2012, $EMC^2$, 17 pages.
Vblock™ Infrastructure Platforms 2010 Vblock Platforms Architecture Overview, Version 1.3, Nov. 2011, The Virtual Computing Environment Company, www.vce.com, 25 pages.
Best Practices for Deploying VMware vCloud Director on Vblock Infrastructure Platforms, Sep. 2011, The Virtual Computing Environment Company, www.vce.com, 20 pages.

(Continued)

Primary Examiner — Joseph E Avellino
Assistant Examiner — Tsung Wu
(74) Attorney, Agent, or Firm — Daly, Crowley Mofford & Durkee, LLP

(57) ABSTRACT

Methods and apparatus for provisioning shared NFS storage in a cloud storage environment having a storage layer, a compute layer, a network layer connecting the storage layer and the computer layer, and a management layer coupled to the compute layer.

7 Claims, 15 Drawing Sheets

(56) References Cited

OTHER PUBLICATIONS

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © 2011 VCE Company, The Virtual Computing Environment Company, www.vce.com, 3 pages.

Vblock™ Infrastructure Platforms Technical Overview, © 2011 VCE Company, The Virtual Computing Environment Company, www.vce.com, 8 pages.

Vblock™ Solution for Trusted Multi-Tenancy: Technical Overview, Aug. 2011, The Virtual Computing Environment Company, www.vce.com. 75 pages.

U.S. Appl. No. 13/435,317, filed Mar. 30, 2012.
U.S. Appl. No. 13/629,017, filed Sep. 27, 2012.
U.S. Appl. No. 13/536,705, filed Jun. 28, 2012.
Response to Office Action dated Aug. 8, 2013, U.S. Appl. No. 13/435,317, 11 pages.
Office Action dated Aug. 8, 2013, U.S. Appl. No. 13/435,317, 18 pages.
U.S. Appl. No. 13/536,705 Office Action dated Mar. 27, 2014, 15 pages.
U.S. Appl. No. 14/534,416, filed Nov. 6, 2014, Beach et al.
Office Action dated May 9, 2014 for U.S. Appl. No. 13/435,317, filed Mar. 30, 2012.
U.S. Appl. No. 13/435,317 Notice of Allowance dated Jul. 6, 2015, 8 pages.
U.S. Appl. No. 13/536,705 Response filed on Jul. 21, 2014 8 pages.
U.S. Appl. No. 13/629,017 Notice of Allowance dated Sep. 2, 2014, 18 pages.
U.S. Appl. No. 13/536,705 Notice of Allowance filed Jun. 28, 2012 14 pages.
Response filed Jun. 8, 2015; to Office Action dated Feb. 11, 2015; for U.S. Appl. No. 13/435,317.

\* cited by examiner

METHOD AND APPARATUS FOR PROVISIONING SHARED NFS STORAGE

BACKGROUND

As is known in the art, cloud computing systems contain large numbers of servers, hardware devices, servers, storage systems, networking devices, software modules and components. When configuring a computer system ("host") to communicate with a storage system ("array") using a network based file system ("NFS") provided over the IP protocol, it is common to configure VLANs (virtual local area networks) and access control to the network-attached storage volumes. A VLAN ("vlan") represents a logical segmentation of a physical Ethernet network. Membership in the VLAN by a host or array is determined by physical connectivity to an intermediate network device ("switch") to an Ethernet adaptor ("adaptor") located on the host and array components, which are identified by IP (internet protocol) address and MAC (media access control) address.

Sets of hosts, switches, and arrays assembled in close proximity make up a unit of cloud infrastructure sometimes referred to as a pod ("pod") of devices. The pod components are physically connected via Ethernet networks. The logical configuration of pod components and networks creates a platform that is sold or leased as a service ("service") from a menu of predefined configuration offerings ("offering") for consumers of cloud computing. Offerings from vendors define the type and quantity of resources, such as three servers with 16 GB of memory having four processors with 20 GB of disk space each, and a shared storage volume of 200 GB. This allows for the consumer to use the host and storage resources in predetermined offerings within the pods making up the cloud.

SUMMARY

In general, method and apparatus of the present invention use an information model (IM) comprising hosts, arrays, network devices, VLANs for service offerings in a cloud-computing environment. With user input, the system configurations for host adaptors and arrays can be computed to create the storage service from the storage service offering. A provisioning work flow executes changes to logical configurations of pods of infrastructure comprised of hosts, network, and array resources. Using this provisioning workflow the needed transformations to the configurations can be made. The provisioning workflow identifies the set of hosts and adaptors along with the network configurations and array configurations required to assemble an operational cluster of storage connected compute nodes within the pod infrastructure.

This set of changes can be applied to the element management systems of the infrastructure platform thereby providing infrastructure as a service for consumers of the pod architecture. The infrastructure service comprises network connected NFS storage shared between trusted compute nodes running an operating system, such as VMWare ESX, capable of sharing resources using the common NFS storage.

Using this information model in conjunction with a grading and classification system for physical resources the system can identify and create logical resources required to satisfy a set of constraints for logical configuration, security, and class of resource selection. Classes of resources can then be provisioned into infrastructure services using a single service offering definition into a pod infrastructure. Selecting and activating a predefined service offering can create this infrastructure service in accordance with user instruction.

In one aspect of the invention, a method comprises: in a cloud computing environment having a management layer, a compute layer, a network layer, a storage layer, and pods, defining service offerings for a user comprising network configurations, storage configurations, and compute configurations, receiving a user selection for a first one of the service offerings, selecting a first one of the pods based upon the user selection including class of service, creating, using a computer processor, a volume with configuration settings based upon the user selection, and exposing the created volume using NFS using a determined IP address.

In another aspect of the invention, an article comprises a computer readable medium comprising non-transitory stored instructions that enable a machine to perform: in a cloud computing environment having a management layer, a compute layer, a network layer, a storage layer, and pods, defining service offerings for a user comprising network configurations, storage configurations, and compute configurations, receiving a user selection for a first one of the service offerings, selecting a first one of the pods based upon the user selection including class of service, creating, using a computer processor, a volume with configuration settings based upon the user selection, and exposing the created volume using NFS using a determined IP address.

In a further aspect of the invention, a cloud computing system comprises a storage layer, a compute layers, a network layer connecting the storage layer and the computer layer, a management layer coupled to the compute layer, the management layer comprising a processor and stored instructions in memory to enable the system to: define service offerings for a user comprising network configurations, storage configurations, and compute configurations, receive a user selection for a first one of the service offerings, select a first one of a plurality of pods based upon the user selection including class of service, create, using a computer processor, a volume with configuration settings based upon the user selection, and expose the created volume using NFS using a determined IP address.

BRIEF DESCRIPTION OF THE DRAWINGS

The foregoing features of this invention, as well as the invention itself, may be more fully understood from the following description of the drawings in which.

DETAILED DESCRIPTION

Figure 1:
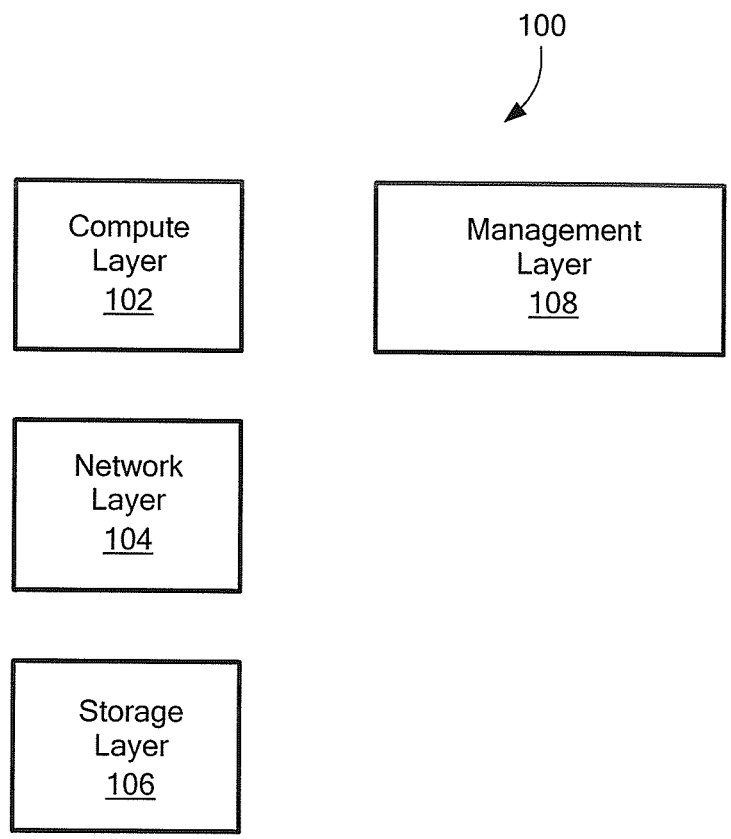
FIG. 1 is a high level schematic representation of a cloud storage system having network shared storage in accordance with exemplary embodiments of the invention.

FIG. 1 shows an exemplary cloud storage environment 100 having a compute layer 102, a network layer 104, a storage layer 106, and a management layer 108 having provisioning of NFS storage in accordance with exemplary embodiments of the invention. The environment may be referred to as a platform. It is understood that any practical number of platforms can be combined into a cloud storage environment.

The compute layer 102 comprises components, such as blade servers, chassis and network interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
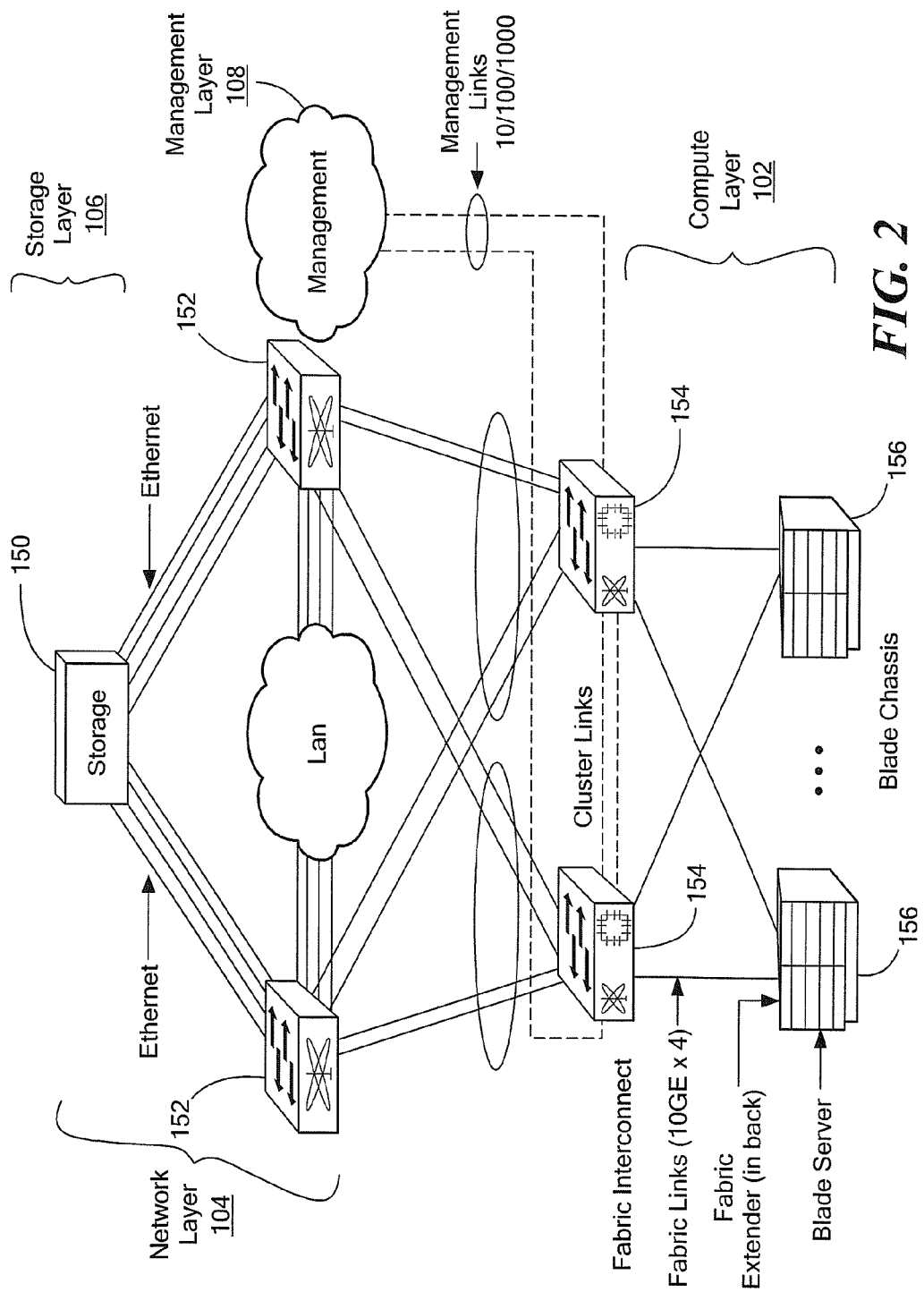
FIG. 2 is a schematic representation showing further detail of the cloud storage system of FIG. 1.

FIG. 2 shows further detail for the environment 100 of FIG. 1. The storage layer 106 can include storage components 150, such as CLARIION storage components from EMC Corporation of Hopkinton Mass. The network layer 104 can include a pair switches 152, such as Nexus 5000 Series Ethernet Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
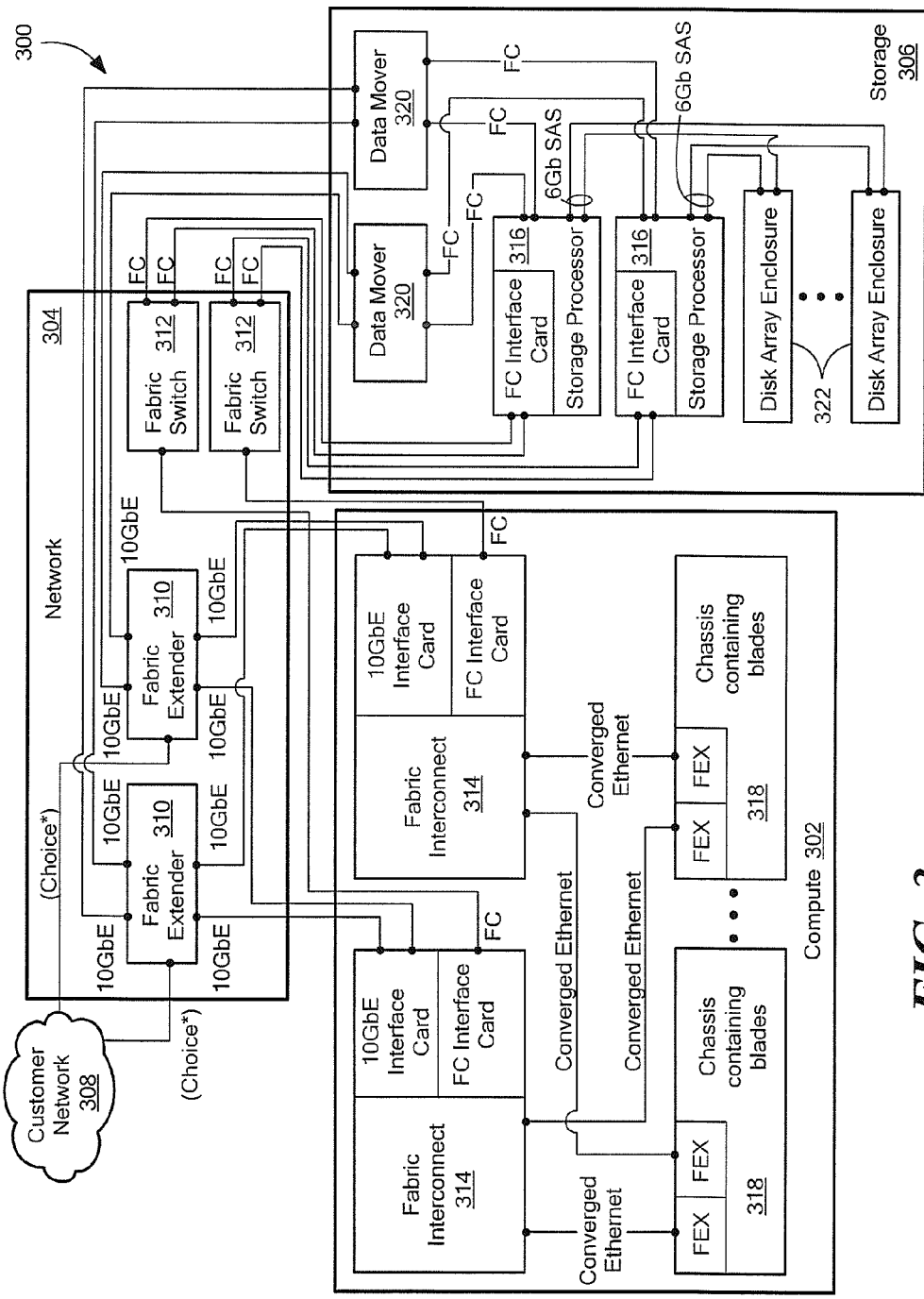
FIG. 3 is a schematic representation showing further detail of the cloud storage system if FIG. 2.
Figure 4:
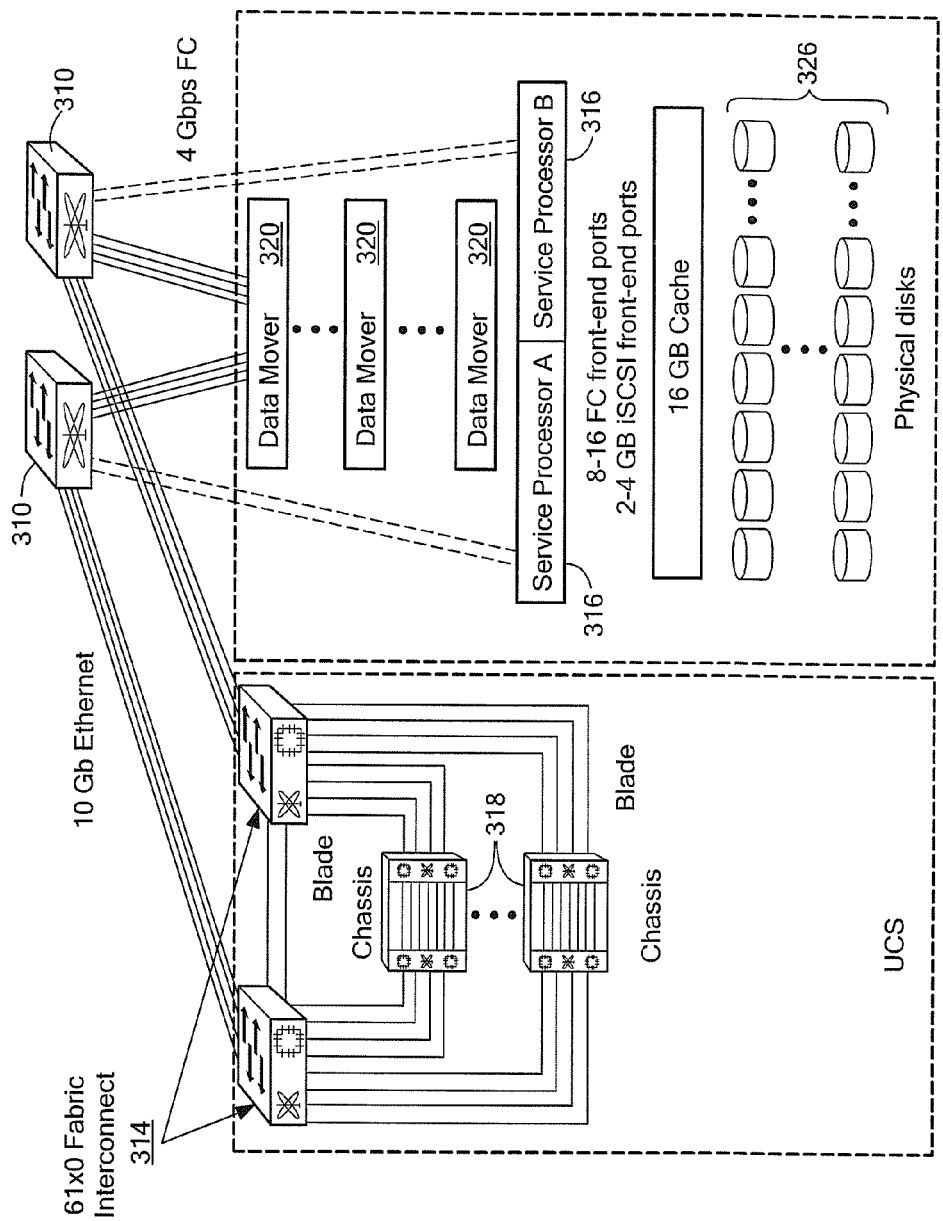
FIG. 4 is a schematic representation showing further detail of a storage layer of the cloud storage system of FIG. 3.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports and 2 to 4 Data Mover compute notes containing Ethernet adaptors.

It is understood that a variety of other configurations having different interconnections and storage configuration can be provided to meet the needs of a particular application.

The management layer can include a number of applications to perform various functions for overall control, configuration, etc of the various platform components. For example, management applications can include a virtualization function, such as vSphere/vCenter, by VMware of Palo Alto, Calif. A further management application can be provided as part of the Unified Computing System (UCS) by Cisco. It is understood that the blade chassis and fabric interconnection can be considered part of the UCS. Another management application can includes a management interface, such as EMC Unisphere, to provide a flexible, integrated experience for managing existing storage systems, such as CLARIION and CELERRA storage devices from EMC. A further management application includes a platform element manager, such as unified infrastructure manager (UIM) by EMC, for managing the configuration, provisioning, and compliance of the platform.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a to generic product, function, or module.

Figure 5:
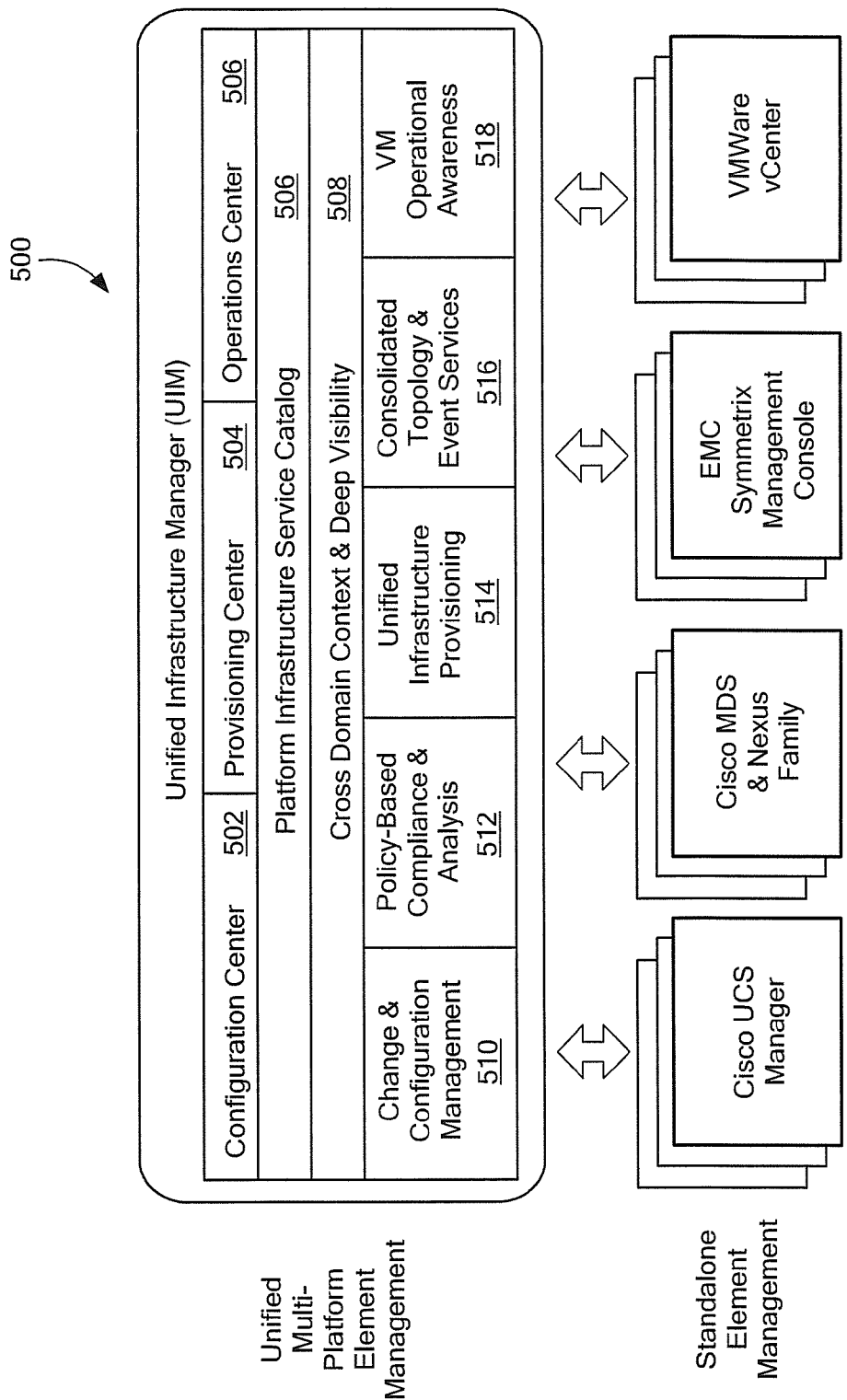
FIG. 5 is a schematic representation of a unified infrastructure manager (UIM) module.

FIG. 5 shows an exemplary unified infrastructure manager 500 having provisioning of shared NFS storage and operating systems in accordance with exemplary embodiments of the invention. In an exemplary embodiment, the unified infrastructure manager 500 includes a configuration center module 502, a provisioning center module 504, and an operations center module 506. Below these modules is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications. The unified infrastructure manager 500 performs platform deployment by abstracting the overall provisioning aspect of the platform(s) and offering granular access to platform components for trouble shooting and fault management.

Figure 6:
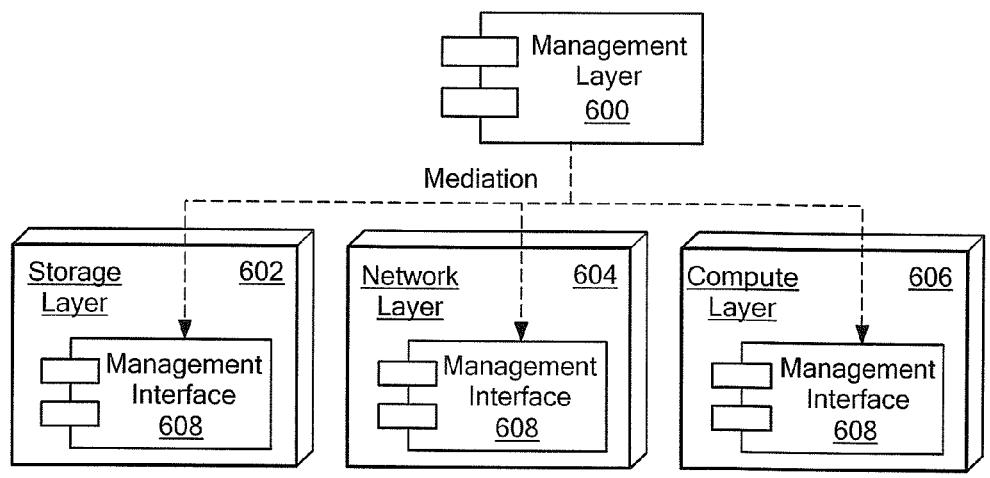
FIG. 6 is a schematic representation of layers having a management interface.

FIG. 6 shows a management/service layer 600 connected to a storage layer 602, a network layer 604, and a compute layer 606, each having a respective management interface layer 609. In general, the management layer 600 uses device native interfaces provided by the equipment vendor to translate desired configuration settings into actual configuration settings. The native interface is directly related to the equipment vendor. In one embodiment, the service management layer 600 uses native command line interfaces (CLI) provided by software components the equipment manufacturer supplies or using application programming interfaces (APIs) to send commands to the management interface using messaging protocols. The API defines a programming language binding for executing configuration instructions. In both cases the equipment manufacturer supplies computer software that drives the management interface. In the case of the CLI, the commands are either executed on the operating system hosting the management layer and communicating to the device over proprietary protocols or run on the operating system hosting the device management interface. CLIs typically take properties sets and return results in textual or encoded formats such as XML.

EXAMPLE naviseccli -h 192.168.101.40 bind r5 0 -rg 0 -cap 20 -rc 1 -sp a -sq gb -wc 1

APIs provide a native computer programming language binding that can be executed from the native computer programming language. Java is a widely used language in computer programming and many vendors provide java language libraries and examples to execute commands against the management interface of their devices.

Figure 7:
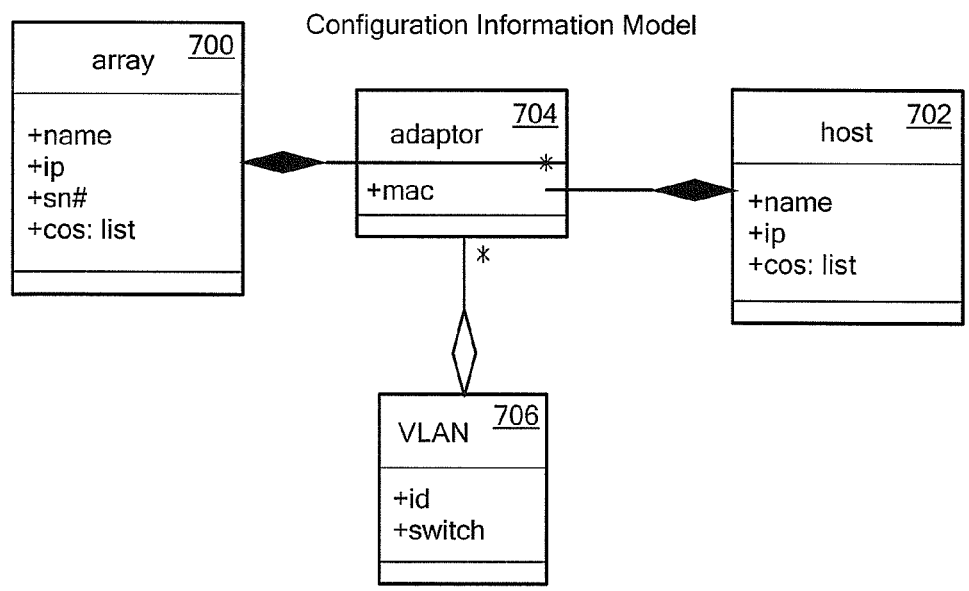
FIG. 7 is a representation of a configuration information model.

FIG. 7 shows a model of the physical information stored within the management layer of the components in FIG. 1. An array model component 700 contains properties that describe the pod and management information for the array. A host model component 702 contains properties that describe the pod and management information for the host. Instances of an adaptor model component 704 are associated with arrays and hosts to indicate the array or host has an Ethernet adaptor. Hosts and arrays may have many adaptors. Adaptors 704 may have additional detailed properties that indicate the identifier for the adaptor and network profiles indicating the IP addresses and MAC addresses of the adaptor. Instances of VLAN model components 706 are loosely associated with the adaptors representing the logical network connectivity between the adaptor and the other adaptors associated to that VLAN.

Figure 8:
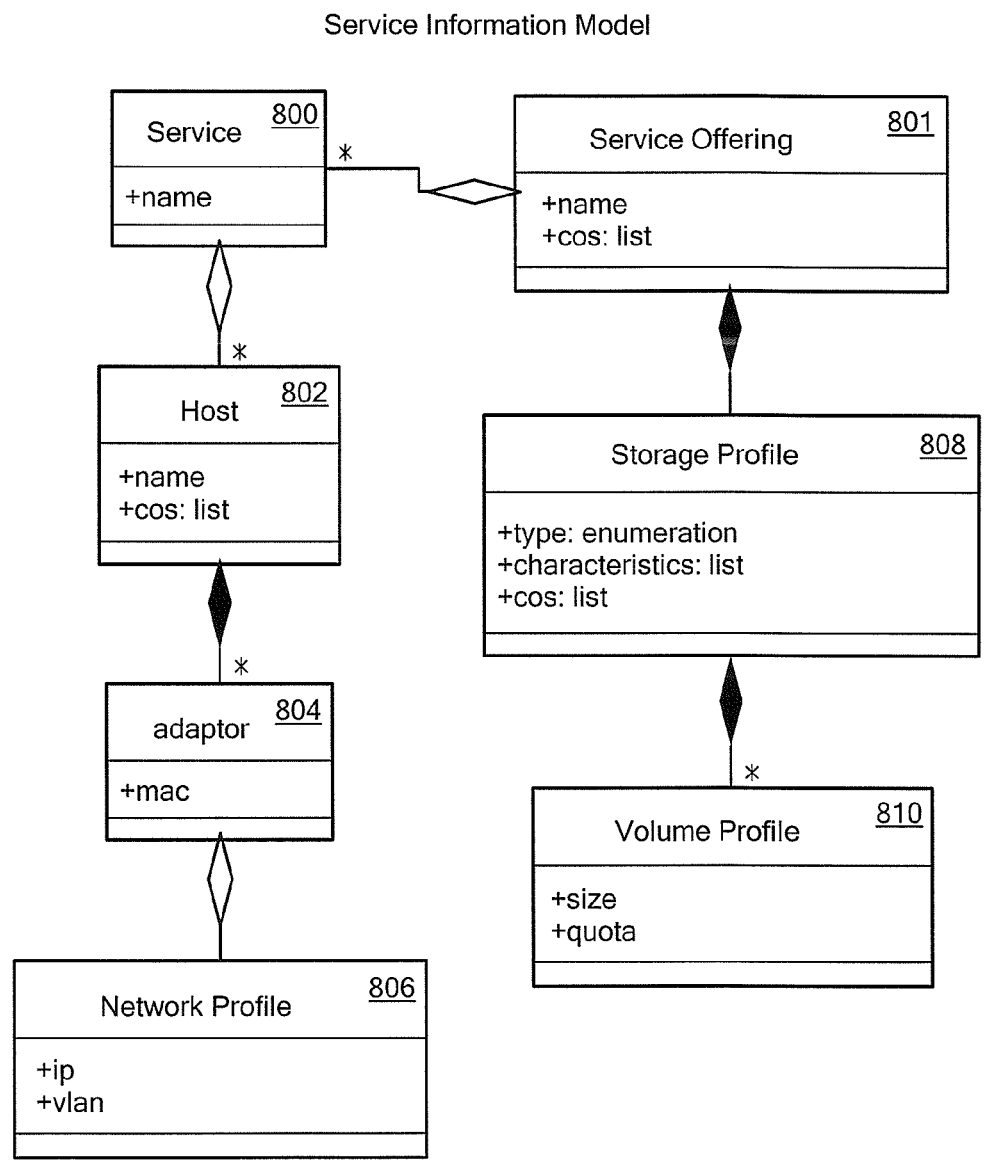
FIG. 8 is representation showing a service configuration model.
Figure 8A:
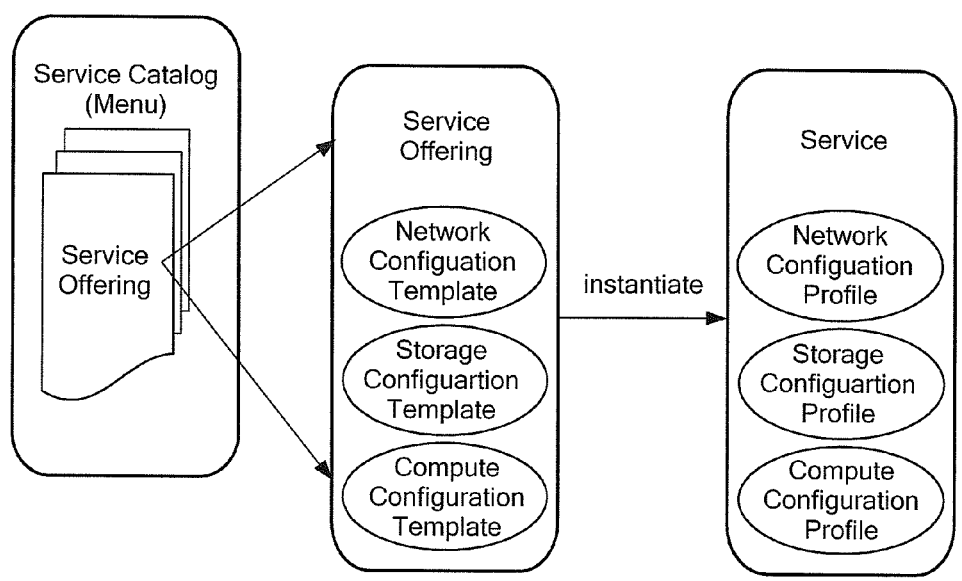
FIG. 8A is representation of a service catalog menu and service offerings.

FIG. 8 shows a model of the service and offering information stored within the management layer of the components in FIG. 7. A service 800 is a representation of a desired service as described by a service offering 801. An exemplary relationship is shown in FIG. 8A where the service properties as described in the offering are used to describe the characteristics and properties of the service to be created. A service catalog has a menu of service offerings, each having network configuration settings, service configuration settings, and compute configuration settings.

Referring again to FIG. 8, one or more hosts 802 are associated with a service to fulfill the compute requirements of the service. One or more network adaptors 804 are associated with a service to indicate the need for Ethernet connectivity to a network. A network profile 806 is associated with each adaptor 804 that indicates the VLAN and IP address required to fulfill the storage connectivity using the Ethernet. This network profile 806 is associated to a storage profile 808 to indicate that the host is to obtain storage from a network with this VLAN and IP network.

The service offering 801 is used to hold the relationships and detailed description for the user to choose the offering from a menu of offerings. The storage profile 808 is associated with the offering 801 to indicate the class of storage and service settings for the storage to be configured such as features like de-duplication, write once read many, auto-extension, maximum auto-extensions, thin provisioning, etc. A volume profile 810 is associated with the storage profile 808 to indicate specific volume properties and characteristics such as size and quota limitations.

Figure 9:
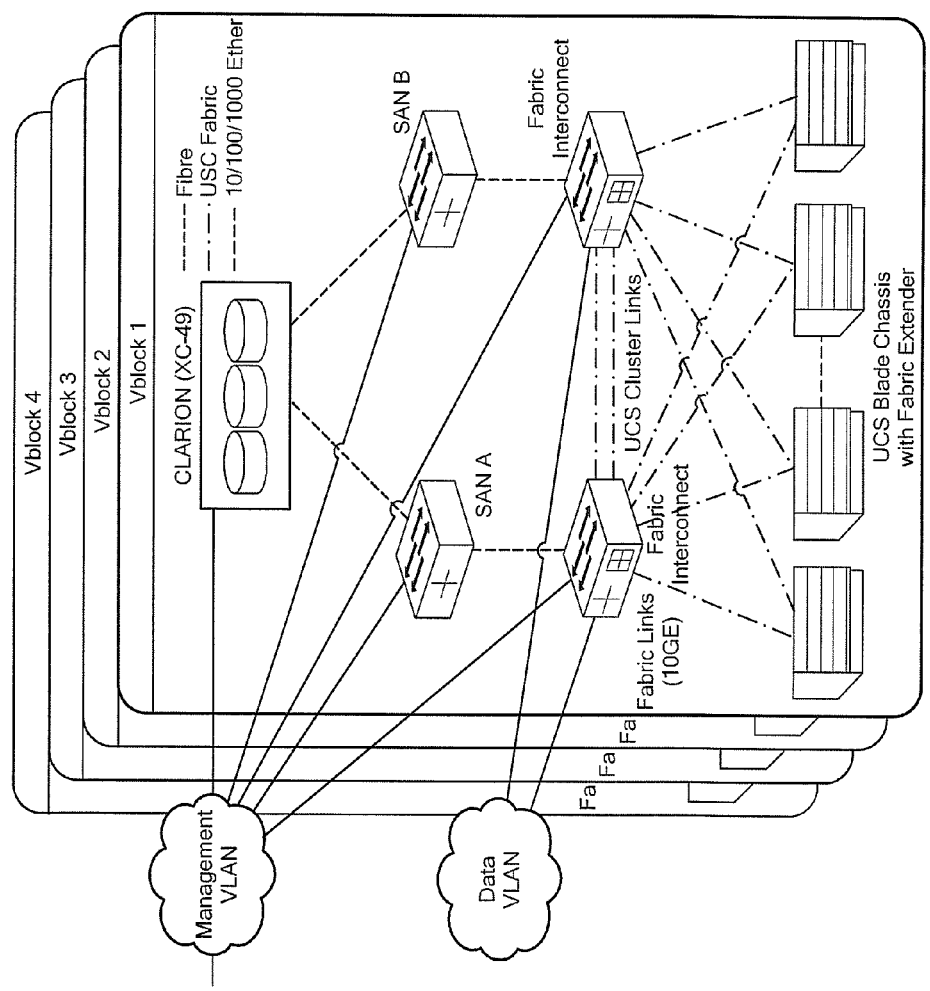
FIG. 9 is a schematic representation showing pods in a cloud environment.
Figure 10:
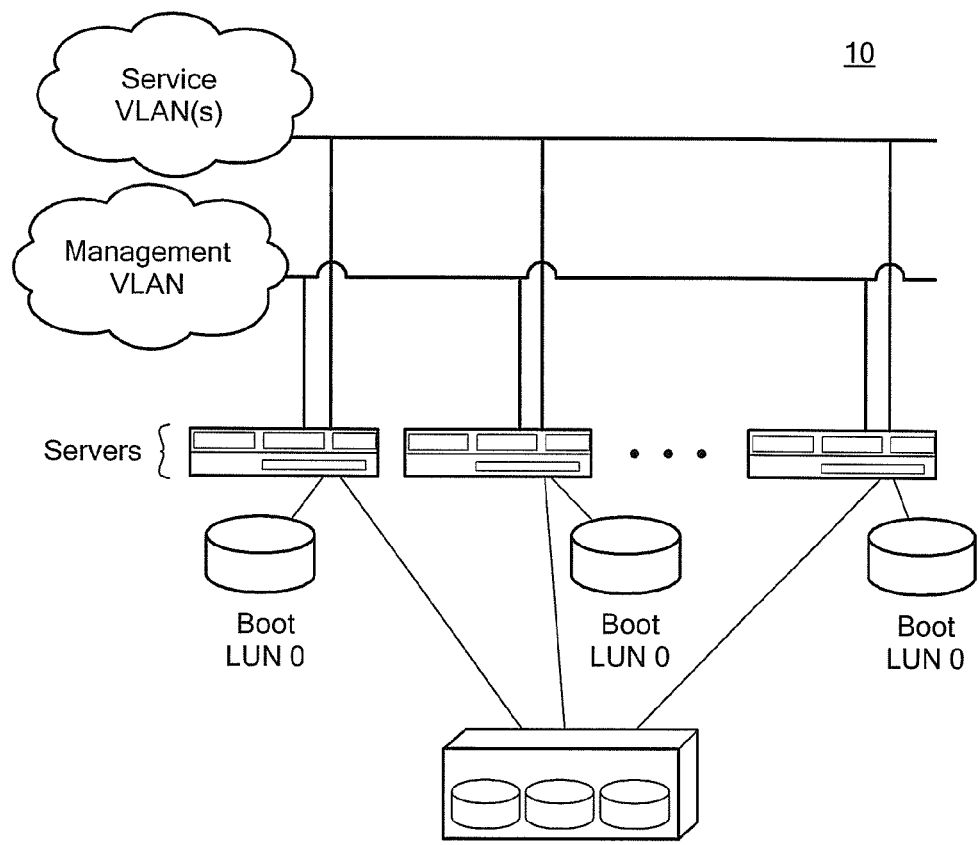
FIG. 10 is a schematic representation of servers coupled to shared storage.

FIG. 9 shows a series of "PODs" used to create cloud infrastructures, where each Vblock is considered its own POD. FIG. 10 shows a set of servers in a POD arranged in a cluster with shared storage.

Figure 11:
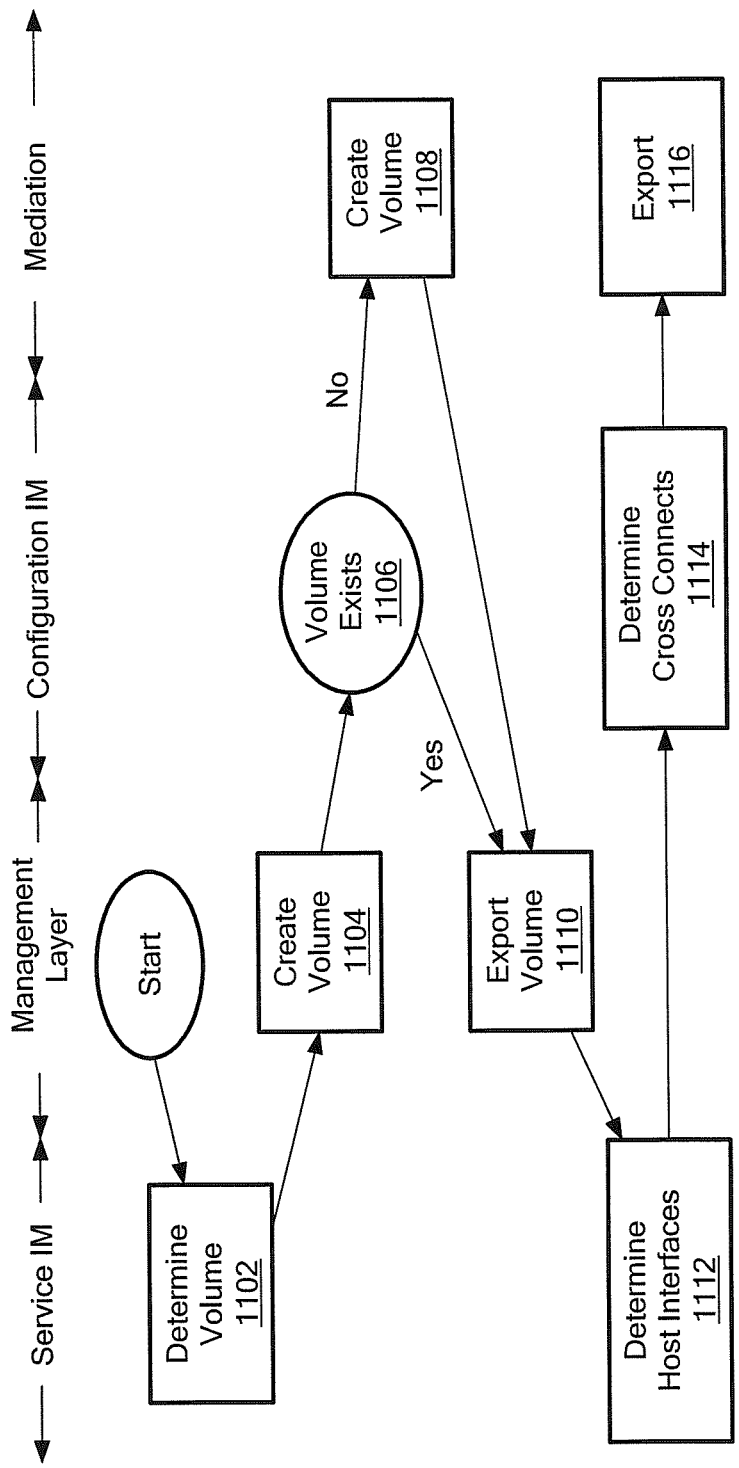
FIG. 11 is a flow diagram showing an exemplary sequence of steps for provisioning shared NFS storage.

FIG. 11 shows an exemplary sequence of steps for associating a NFS shared volume to a host. Initially, a user of the management layer selects an offering and chooses to have it implemented. The information presented to make this choice is described in the service information model and presented as a menu option for selection. The offerings can be defined statically and predetermined before accepting the menu selection. Optionally an administrator of the POD infrastructure can define a canned set of offerings to augment and extend the predefined offerings of the management layer.

In step 1102, based on the offering chosen by the user, a pod can be selected by the management layer using the service information model that defines the desired quality of service and class of service required. This information is described in the service information model storage profile and volume profile (see FIGS. 8 and 8A). Using this information the system can determine the correct pod placement for the volume.

Figure 11A:
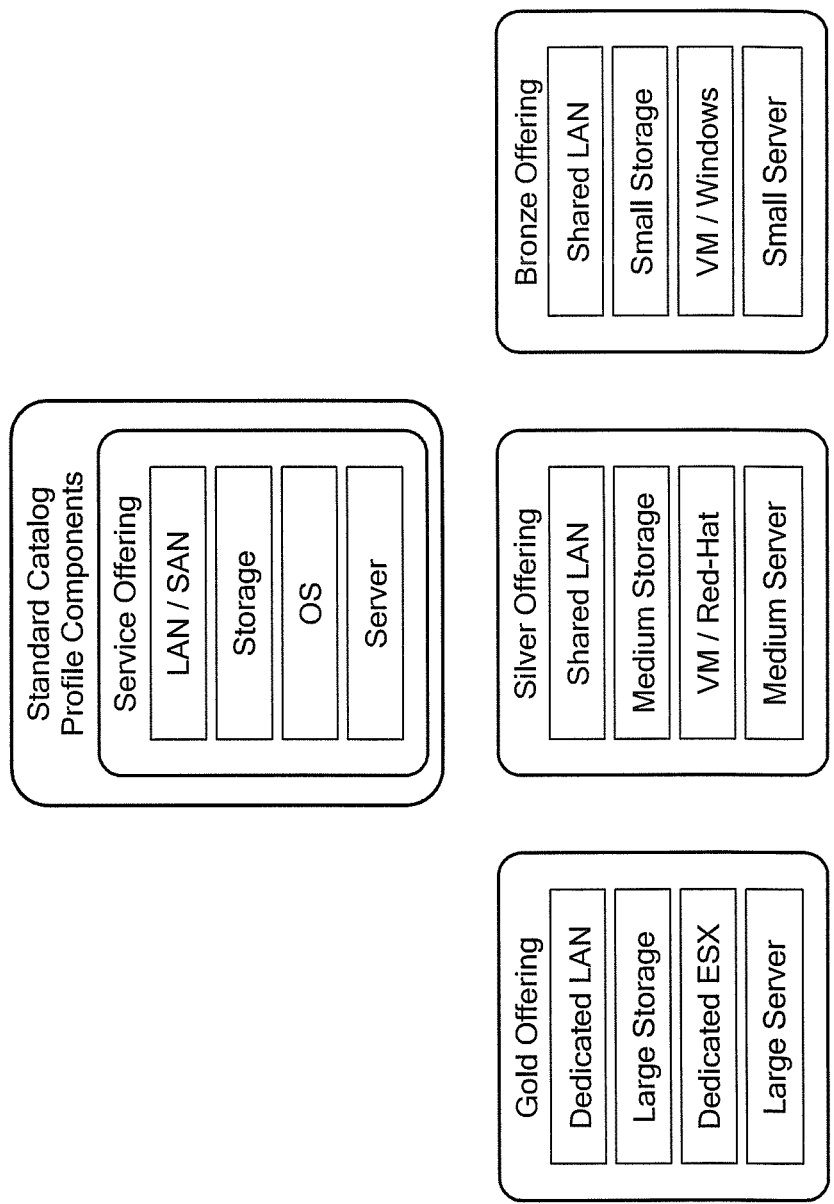
FIG. 11A is a pictorial representation of various service offerings.

A POD is chosen by matching the class of service defined in the offering with the class of service provided by the POD. The Class of Service (CoS) is defined as a label that is relative to the service provided by the POD. For example, as shown in FIG. 11A, a Gold class of service could be defined as having a dedicated LAN, large storage, dedicated ESX and a large server. Silver and Bronze offerings provide less in at least one area. In embodiment, the Gold class of service provides de-duplication. When selecting a POD for service placement the management layer selects an array that provides the de-duplication feature for Gold services. The list of CoS for an array would be cross referenced with the list of CoS for a service offering to locate an acceptable pod and array on which to create the service.

In step 1104, once the volume characteristics and properties are known from the service information model, the service layer can begin to create the volume by defining the configuration settings such as size, protection levels, and placement of the volume on a data mover in relationship to the VLANs connecting the host and array adaptors from the configuration model. The properties of the volume are used in conjunction with the CoS of the Storage Profile to create the configuration settings of the volumes in the service. The Service's network profile determines the VLAN upon which to establish the network connection to the network shared volume. In step 1106, it is determined whether the volume exists, such as by using the management interface of the array the service layer to query the array(s) of the pod to see if there were already volumes created for that service If it is determined the service does not already contain a volume that meets the criteria of the offering, the management layer executes commands through a mediation interface to the physical device management system to create the volume using the characteristics determined above in step 1108.

Processing continues in step 1110 wherein the volume is exported. Using the network profile information contained in the service information model, the service layer determines the network access restrictions consisting of the VLAN, IP address, and authentication credentials for the network-attached volume.

In step 1112, a host interface is determined using the service information model network profile and the VLAN and IP address settings are determined for the host adaptor. In step 1114, the management layer determines cross-connects. Using the VLAN the correct adaptor for the array can be determined by cross-referencing the membership of the adaptor in a given VLAN. In step 1116, using the information determined above, the array management interface is configured to expose the created volume using NFS protocol to the determined IP address.

Figure 12:
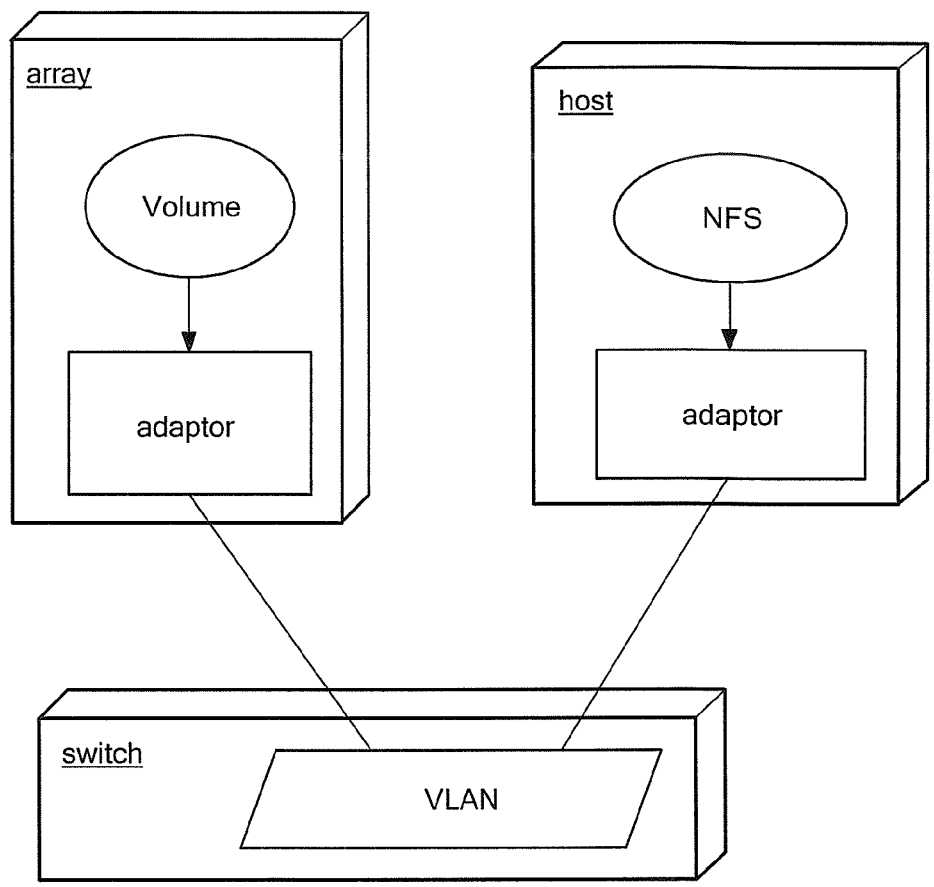
FIG. 12 is a schematic representation of a VLAN coupled to an array and host in a cloud environment.

FIG. 12 is a logical schematic for the service to be created as the result of the flow of FIG. 11. An array is told via mediation to create a volume and export it to a given IP address. A volume is created using the service offering storage and volume profiles. A array adaptor exports the volume to the IP address and implements the access control defined in the service network profile. A switch/vlan is utilized to carry NFS over IP traffic from the adaptor of the array to the adaptor of the host. The host uses its operating system network file system sub-system to make the array volume visible to the guest of the host. The nfs uses the adaptor interface to access the IP network and access the volume exposed over the switch's VLAN.

Figure 13:
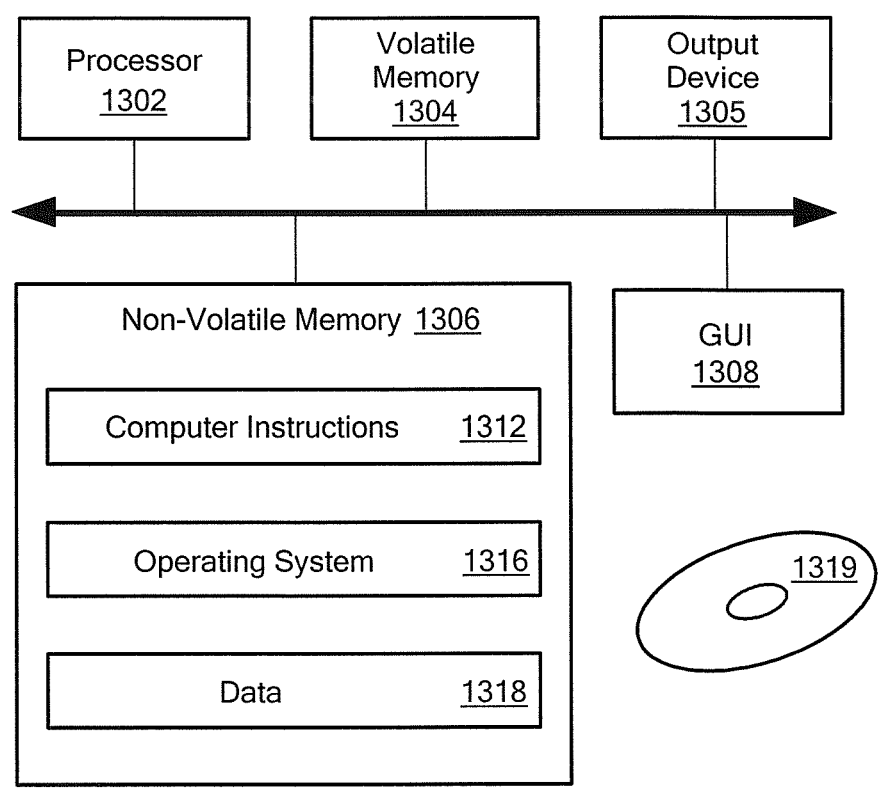
FIG. 13 is an exemplary computer that can perform at least some of the processing described herein.

Referring to FIG. 13, a computer includes a processor 1302, a volatile memory 1304, an output device 1305, a non-volatile memory 1306 (e.g., hard disk), and a graphical user interface (GUI) 1308 (e.g., a mouse, a keyboard, a display, for example). The non-volatile memory 1306 stores computer instructions 1312, an operating system 1316 and data 1318, for example. In one example, the computer instructions 1312 are executed by the processor 1302 out of volatile memory 1304 to perform all or part of the processing described above. An article 1319 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
    in a cloud computing environment having a management layer, a compute layer, a network layer, a storage layer, and pods, wherein each of the pods has a blade server, fabric interconnect, switches, and storage that define a class of service for the respective pods;
    defining service offerings for a user comprising network configurations, storage configurations, and compute configurations, wherein each of the service offerings includes a LAN component, a storage component, and a server component, and wherein the service offerings provide different levels of class of service, wherein the service offerings are managed by a server associated with the management layer wherein at least one of the service offerings includes de-duplication;
    creating a model of physical information including an array model component describing array pod and management information for the selected first one of the pods, a host model component describing pod and management information for the host, an adaptor model component indicating whether an array and/or host have an adaptor, and a VLAN model component associated with the adaptor model component;
    creating a service information model comprising: a service component, a host component associated with the service component, a network adaptor component associated with the host component to indicate a need for connectivity to a network, and a network profile component associated with the adaptor component to indicate a VLAN and IP address for storage connectivity;
    employing a service offering component to contain a description of the service offerings in a menu of service offerings, a storage profile component associated with the service offering component, and a volume profile component associated with the storage profile component to indicate specific volume properties including volume;
    receiving a user selection for a first one of the service offerings;
    selecting a first one of the pods based upon the user selection including the class of service and by matching a class of service in the selected first one of the service offerings to the first one of the pods;
    associating a volume profile with a storage profile to indicate volume properties and characteristics including size;
    determining whether a volume exists by querying the pod to determine whether the volume was created for the selected first one of the service offerings;
    creating, using a computer processor, the volume with configuration settings based upon the user selection, the storage profile and the volume profile; and
    exposing the created volume using NFS using a determined IP address,
    wherein a host can make the created volume visible to a guest of the host,
    wherein creating the volume further comprises configuring settings that include one or more of size, protection level, and data mover in relation to a VLAN connecting host and array adaptors.

2. The method according to claim 1, wherein the service offering includes a network configuration template, a storage configuration template, and a compute configuration template.

3. The method according to claim 1, further including determining network access restrictions.

4. An article, comprising
    a non-transitory computer readable medium comprising stored instructions that enable a machine to perform:
    in a cloud computing environment having a management layer, a compute layer, a network layer, a storage layer, and pods, wherein each of the pods has a blade server, fabric interconnect, switches, and storage that define a class of service for the respective pods;
    defining service offerings for a user comprising network configurations, storage configurations, and compute configurations, wherein each of the service offerings includes a LAN component, a storage component, and a server component, and wherein the service offerings provide different levels of class of service, wherein the service offerings are managed by a server associated with the management layer, wherein at least one of the service offerings includes de-duplication;

creating a model of physical information including an array model component describing array pod and management information for the selected first one of the pods, a host model component describing pod and management information for the host, an adaptor model component indicating whether an array and/or host have an adaptor, and a VLAN model component associated with the adaptor model component;

creating a service information model comprising: a service component, a host component associated with the service component, a network adaptor component associated with the host component to indicate a need for connectivity to a network, and a network profile component associated with the adaptor component to indicate a VLAN and IP address for storage connectivity;

employing a service offering component to contain a description of the service offerings in a menu of service offerings, a storage profile component associated with the service offering component, and a volume profile component associated with the storage profile component to indicate specific volume properties including volume;

receiving a user selection for a first one of the service offerings;

selecting a first one of the pods based upon the user selection including the class of service and by matching a class of service in the selected first one of the service offerings to the first one of the pods;

associating a volume profile with a storage profile to indicate volume properties and characteristics including size;

determining whether a volume exists by querying the pod to determine whether the volume was created for the selected first one of the service offerings;

creating, using a computer processor, the volume with configuration settings based upon the user selection, the storage profile and the volume profile; and exposing the created volume using NFS using a determined IP address, wherein a host can make the created volume visible to a guest of the host, wherein creating the volume further comprises configuring settings that include one or more of size, protection level, and data mover in relation to a VLAN connecting host and array adaptors.

5. The article according to claim 4, wherein the service offering includes a network configuration template, a storage configuration template, and a compute configuration template.

6. The article according to claim 4, further including instructions for determining network access restrictions.

7. A cloud computing system, comprising:
a storage layer;
a compute layers;
a network layer connecting the storage layer and the computer layer;

a management layer coupled to the compute layer, the management layer comprising a processor and stored instructions in memory to enable the system to perform:

defining service offerings for a user comprising network configurations, storage configurations, and compute configurations, wherein each of the service offerings includes a LAN component, a storage component, and a server component, and wherein the service offerings provide different levels of class of service, wherein the service offerings are managed by a server associated with the management layer, wherein at least one of the service offerings includes de-duplication;

creating a model of physical information including an array model component describing array pod and management information for the selected first one of the pods, a host model component describing pod and management information for the host, an adaptor model component indicating whether an array and/or host have an adaptor, and a VLAN model component associated with the adaptor model component;

creating a service information model comprising: a service component, a host component associated with the service component, a network adaptor component associated with the host component to indicate a need for connectivity to a network, and a network profile component associated with the adaptor component to indicate a VLAN and IP address for storage connectivity;

employing a service offering component to contain a description of the service offerings in a menu of service offerings, a storage profile component associated with the service offering component, and a volume profile component associated with the storage profile component to indicate specific volume properties including volume;

receiving a user selection for a first one of the service offerings;

selecting a first one of the pods based upon the user selection including the class of service and by matching a class of service in the selected first one of the service offerings to the first one of the pods;

associating a volume profile with a storage profile to indicate volume properties and characteristics including size;

determining whether a volume exists by querying the pod to determine whether the volume was created for the selected first one of the service offerings;

creating, using a computer processor, the volume with configuration settings based upon the user selection, the storage profile and the volume profile; and exposing the created volume using NFS using a determined IP address, wherein a host can make the created volume visible to a guest of the host, wherein creating the volume further comprises configuring settings that include one or more of size, protection level, and data mover in relation to a VLAN connecting host and array adaptors.

* * * * *